(12) United States Patent
Doyle et al.

(10) Patent No.: US 7,670,488 B2
(45) Date of Patent: Mar. 2, 2010

(54) ECONOMICAL FILTER CHANGING APPARATUS AND METHOD FOR ELECTRICAL DISCHARGE MACHINES AND OTHER APPLICATIONS

(75) Inventors: Edward M. Doyle, Bloomfield Hills, MI (US); E. Michael Doyle, Okemos, MI (US); Daniel E Argue, Rochester, MI (US)

(73) Assignee: Hoff Engineering Company, Inc., Oxford, MI (US)

( * ) Notice: Subject to any disclaimer, the term of this patent is extended or adjusted under 35 U.S.C. 154(b) by 473 days.

(21) Appl. No.: 11/486,509

(22) Filed: Jul. 14, 2006

(65) Prior Publication Data

US 2008/0011668 A1     Jan. 17, 2008

(51) Int. Cl.
*B01D 35/30* (2006.01)
*B01D 27/00* (2006.01)
*B01D 35/28* (2006.01)

(52) U.S. Cl. ........................ 210/232; 210/435; 210/450; 210/237; 210/238

(58) Field of Classification Search .................. None
See application file for complete search history.

(56) References Cited

U.S. PATENT DOCUMENTS

| | | | |
|---|---|---|---|
| 2,276,824 A | 3/1942 | Carruthers | |
| 4,237,011 A * | 12/1980 | Acosta | 210/237 |
| 4,282,094 A | 8/1981 | Mitchell | 210/167 |
| 4,361,488 A | 11/1982 | White et al. | 210/776 |
| 4,865,724 A | 9/1989 | Brandt et al. | 210/104 |
| 5,417,849 A | 5/1995 | McEwen et al. | 210/109 |
| 5,417,851 A | 5/1995 | Yee | 210/167 |
| 5,935,457 A | 8/1999 | Kita et al. | 219/69.14 |
| 6,485,634 B2 | 11/2002 | Warren et al. | 210/85 |
| 7,138,053 B2 * | 11/2006 | Sato | 210/232 |

FOREIGN PATENT DOCUMENTS

WO    WO 2004/078318     *   9/2004

* cited by examiner

*Primary Examiner*—Krishnan S Menon
*Assistant Examiner*—Benjamin Kurtz
(74) *Attorney, Agent, or Firm*—Gifford, Krass, Sprinkle, Anderson & Citkowski, P.C.

(57) ABSTRACT

A reliable, cost effective system and method are disclosed for exchanging fluid-filtration filters associated with electrical discharge machines (EDMs) and other applications. The basic system comprises a housing to receive the filter, the housing having a top that opens and a bottom cap with an interior inlet fitting coupled to a supply line carrying fluid to be filtered. A pair of opposing swing arms, each having one end pivotally connected to a filter cabinet or other suitable base and another end pivotally connected to an opposing side of the housing, facilitate a first state, wherein the housing and filter are vertically oriented with the bottom opening of the filter sealed against the fitting for filtering operation, and a second state, wherein the housing is pivoted such that the top is oriented downwardly allowing the filter to disengage from the fitting and slide out of the housing.

16 Claims, 11 Drawing Sheets

FIG. 15 though no such limitation is to be inferred. The invention in its broadest aspects is further capable of variations and modifications and changes as come within the scope of the inventive concept shown and described.

ECONOMICAL FILTER CHANGING APPARATUS AND METHOD FOR ELECTRICAL DISCHARGE MACHINES AND OTHER APPLICATIONS

FIELD OF THE INVENTION

The invention relates generally to filtration and fluid control. More particularly, the invention relates to industrial filtration systems for coolants and metal working fluids.

BACKGROUND OF THE INVENTION

Prior art systems used to filter machine tool working fluids conventionally include an electric motor driven pump, one or more dirty side tank(s) for collecting the contaminated working fluid, a filter, a clean side tank or compartment, and (usually) a second pump to return the clean filtrate back to one or more machine tools. Representative systems are disclosed in U.S. Pat. No. 2,276,824 to Carruthers and U.S. Pat. No. 4,282,094 to Mitchell.

The industrial coolant filtering systems in U.S. Pat. No. 4,865,724 to Brandt et al., U.S. Pat. No. 5,417,849 to McEwen et al., and U.S. Pat. No. 6,485,634 to Warren et al. share these characteristics. Also described in the prior art are auxiliary and/or portable filter systems for recycling machine tool working fluids such as U.S. Pat. No. 4,361,488 to White et al. and U.S. Pat. No. 5,417,851 to Yee.

Wire EDMs (Electrical Discharge Machines) require the filtration of large volumes of the working fluid, in this case deionized H2O. The filtration systems of many wire EDMs share the basic configuration of such continuous loop filtration systems. The basic features include a dirty side pump, a dirty side tank, a filter, a clean side tank, and a clean side return pump.

Figure 1:
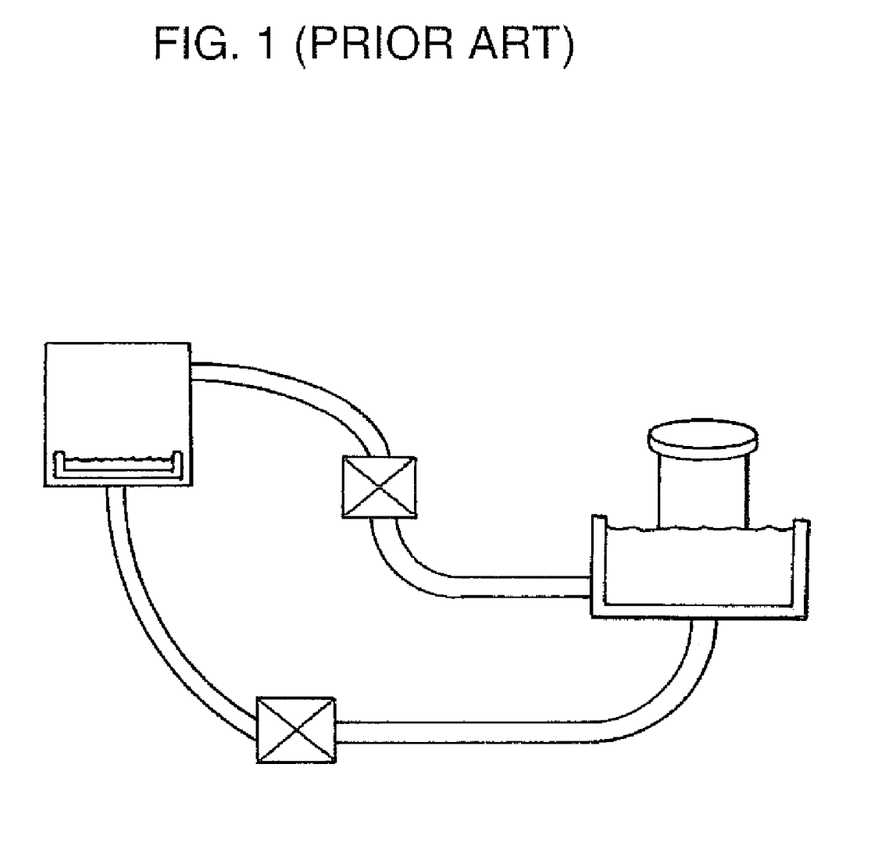
FIG. 1 is a schematic view of a typical continuous loop EDM filtration system.

To properly size the filtration requirements, a unique plumbing arrangement has evolved for EDMs. The flow path of the EDM fluid in a typical wire EDM is shown in FIG. 1. Most of the filtration systems of major wire EDM manufacturers are plumbed inside-outside, that is, the dirty fluid enters the filter thru an orifice in the end cap and exits, once filtered, thru the filter media and down the sides of the element. An advantage of this system is that contaminants are contained inside the dirty filter. At change-out, minimal spillage of dirty water occurs which would foul the clean side.

To accommodate the amount of water necessary to keep the wire EDM functioning, fairly powerful pumps are utilized. This requires high burst strength vessel(s) to encapsulate the pleated filter element(s).

The metal or high strength plastic components (end caps and wrappers) necessary to this approach are both expensive and heavy. The filter element disclosed in U.S. Pat. No. 5,935,457 to Kita et al. is of this type.

What is needed is a more user-friendly, less expensive filtration approach for wire EDMs and other fluid-filtration applications.

SUMMARY OF THE INVENTION

This invention resides in a reliable, cost effective system and method for exchanging fluid-filtration filters for electrical discharge machines (EDMs) and other applications. The preferred embodiment is compatible with filters of the type having a bottom opening to receive fluid to be filtered from the inside out. The basic system comprises a cylindrical housing to receive the filter, the housing having a top that opens, and a bottom cap with an upwardly protruding inlet fitting coupled to a supply line carrying fluid to be filtered.

A pair of opposing swing arms, each having one end pivotally connected to a filter cabinet or other suitable base and another end pivotally connected to a point on the exterior surface of the cylindrical housing, facilitate a first state, wherein the housing and filter are vertically oriented with the bottom opening of the filter sealed against the inlet fitting for filtering operation, and a second state, wherein the housing is pivoted such that the top is oriented downwardly allowing the filter to disengage from the inlet fitting and slide out of the housing.

For EDM applications, the system includes a pair of housings rigidly connected to one another, and wherein each swing arm is attached to a point on the housing exterior equidistant from the apparatus' center. The preferred embodiment further includes a stop member that engages with the swing arms facilitating an intermediate position wherein the housing is tilted for the loading of a new filter. For most applications the housing is generally cylindrical to receive a generally cylindrical, pleated filter. A removable cap is provided to cover the open top during normal filtering operation. The inlet fitting may be round or non-round in cross section to limit use to inventive, propriety filter elements.

BRIEF DESCRIPTION OF THE DRAWINGS

FIG. 4 shows the top of the filter vessel with the wing nuts screwed on;

DETAILED DESCRIPTION OF THE INVENTION

For the purpose of understanding the invention, reference will now be made to the embodiment illustrated in the drawings. It should be understood that no limitation of the invention's scope is thereby intended. The specification relates primarily to filtering the common EDM fluids but its principles could be extended to include other flowable substances including, but not limited to, machining fluids, coolants, and other industrial and process fluids. Further applications of the principles of the invention as illustrated would normally occur to one skilled in the art to which the invention relates.

This specific preferred embodiment is a retrofit filter machine adapted for use on a EDM wherein a large portion of the filter machine consists of fabricated metal components that may be re-used indefinitely.

Figure 2:
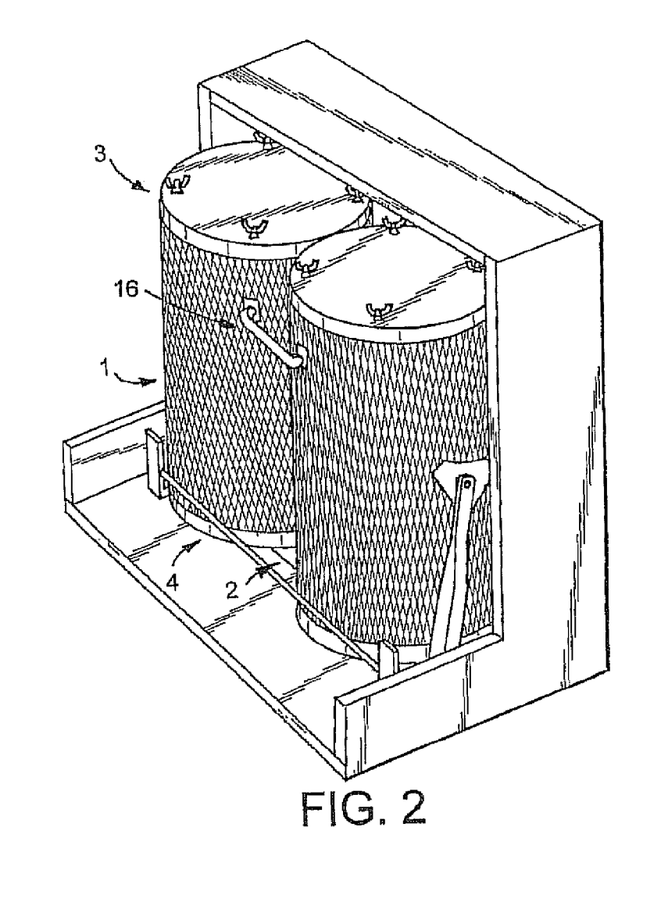
FIG. 2 shows the invention in place inside a filter cabinet.
Figure 3:
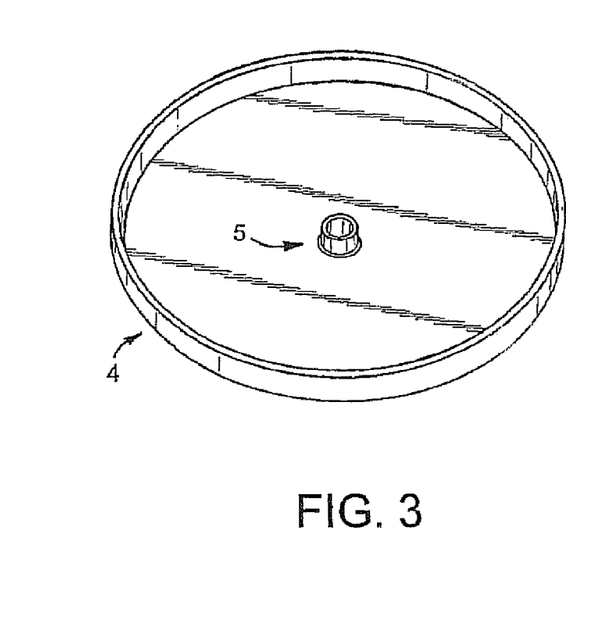
FIG. 3 is a metal end cap with its center aperture.

FIG. 2 is a perspective drawing of the preferred embodiment of the invention in place within a filter cabinet. The system comprises at least one structural housing 3 to receive each filter. In the preferred embodiment perforated steel cylinders 1 permanently fixtured together into a single unit by structural steel bars 2 which are welded to the bottom end caps 4, each of which incorporates a peripheral flange and an inlet fitting 5 (FIG. 3).

Figure 4:
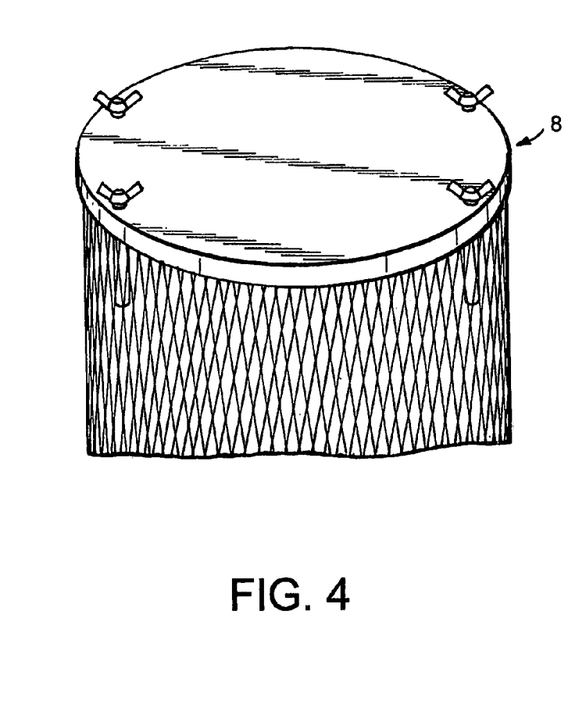
Figure 5:
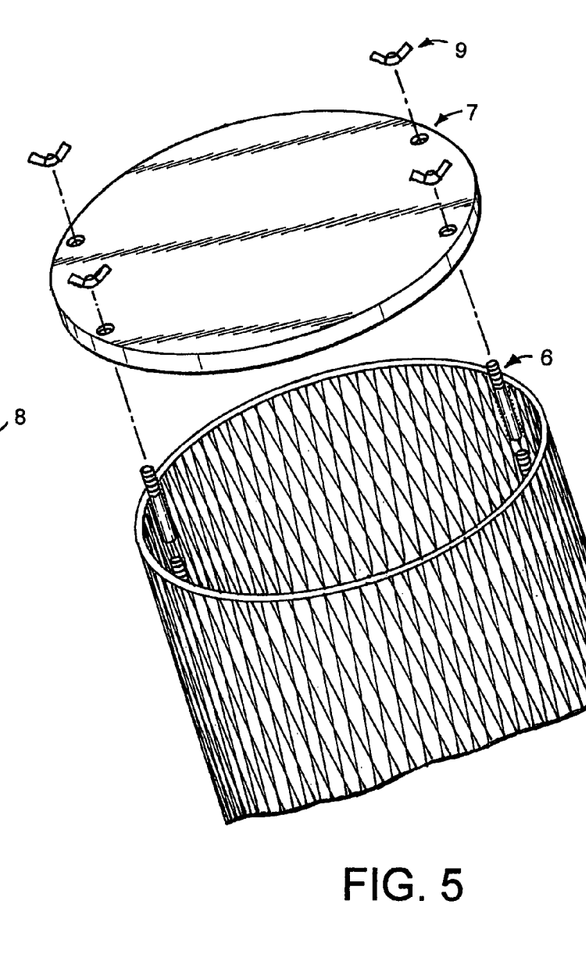
FIG. 5 is an exploded view of the top of an empty filter vessel, showing the bolts which pass through the end cap and to which are fastened the wing nuts.

As shown in FIGS. 4 and 5, threaded screws 6 located parallel to the cylinder center lines and evenly spaced at the top of the cylinder. These threaded screws are welded to the cylinder and extend beyond the cylinder's envelope. A pair of top end caps 8 with apertures 7 permit the extended portions of the threaded screws to project thru the top ends and to receive wing style retention nuts 9, thus enabling closure and structural support for two inside-out flow, disposal filter elements. The two top end caps are conveniently and easily installed and/or removed in a top-end-out servicing position. No tools are required for this procedure.

Figure 6:
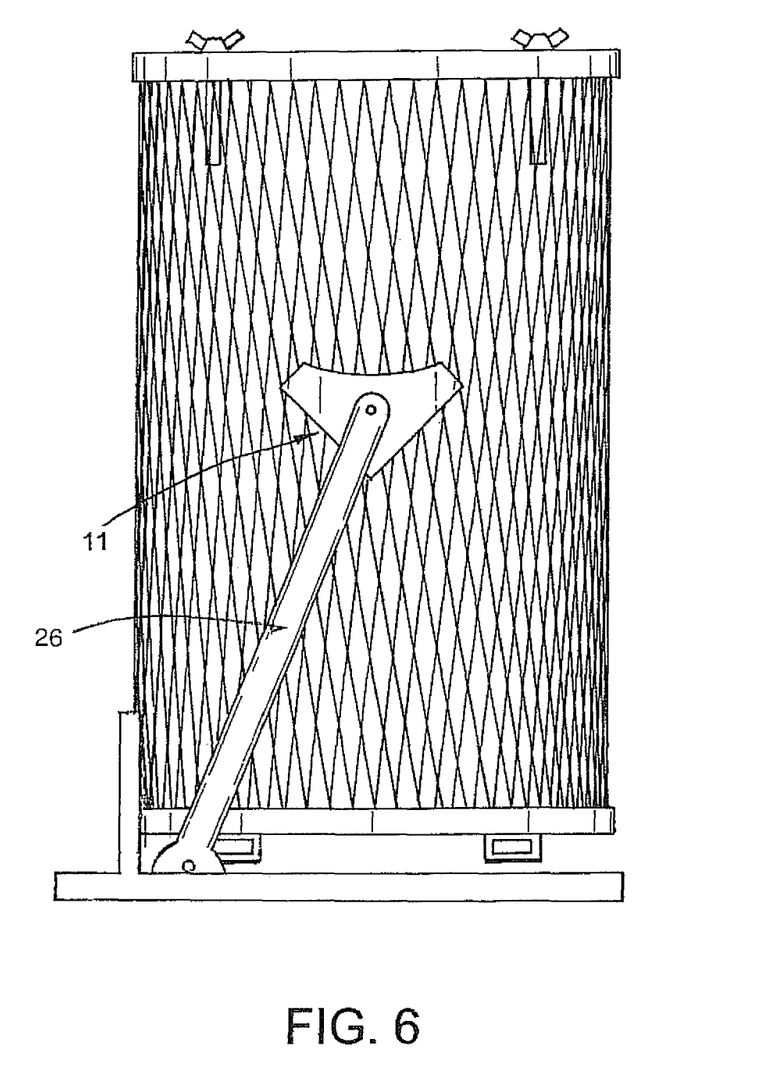
FIG. 6 is a side view of filter vessel with attached swing arm assembly.
Figure 7:
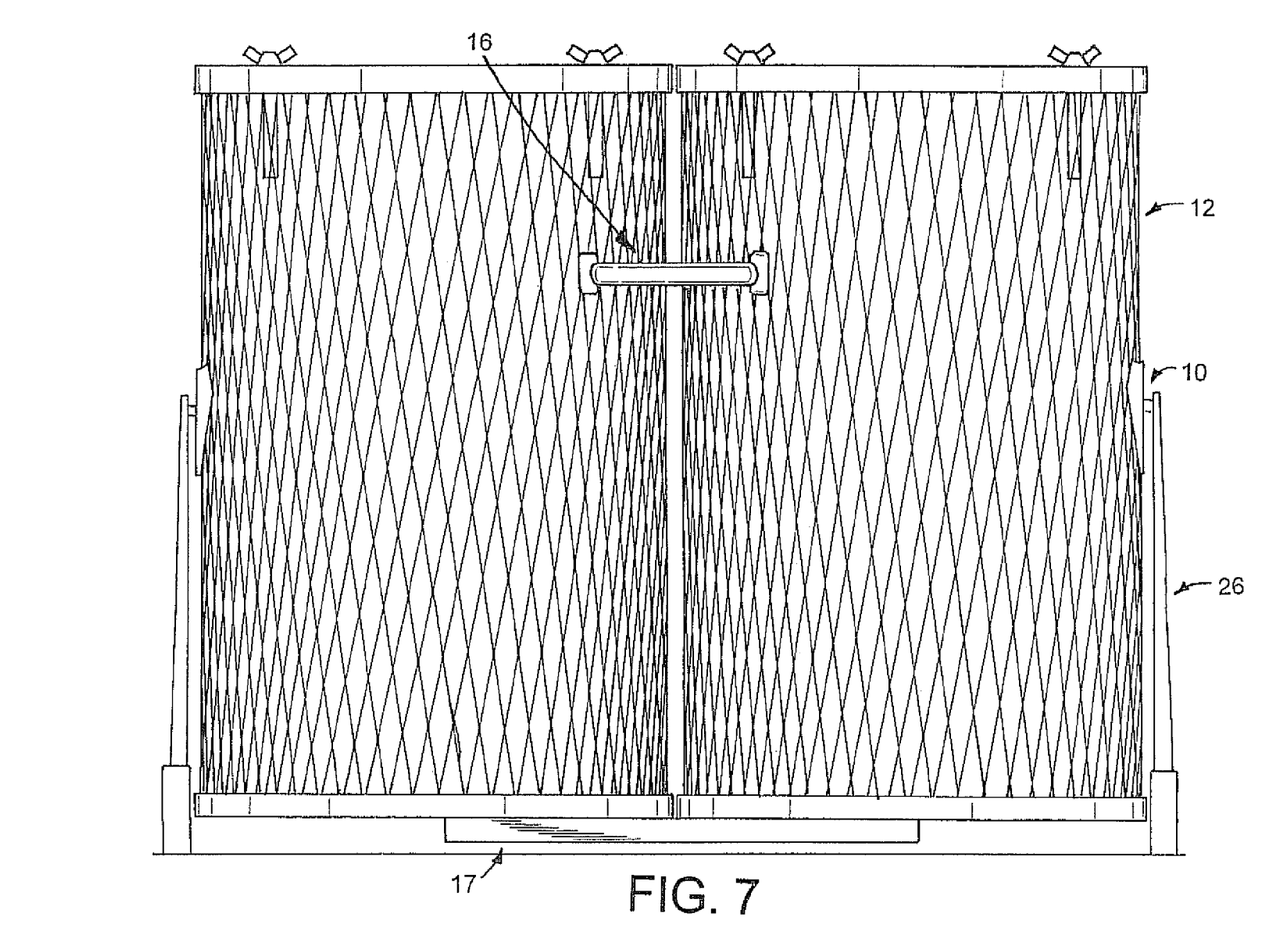
FIG. 7 is a front view of the filter machine.
Figure 8:
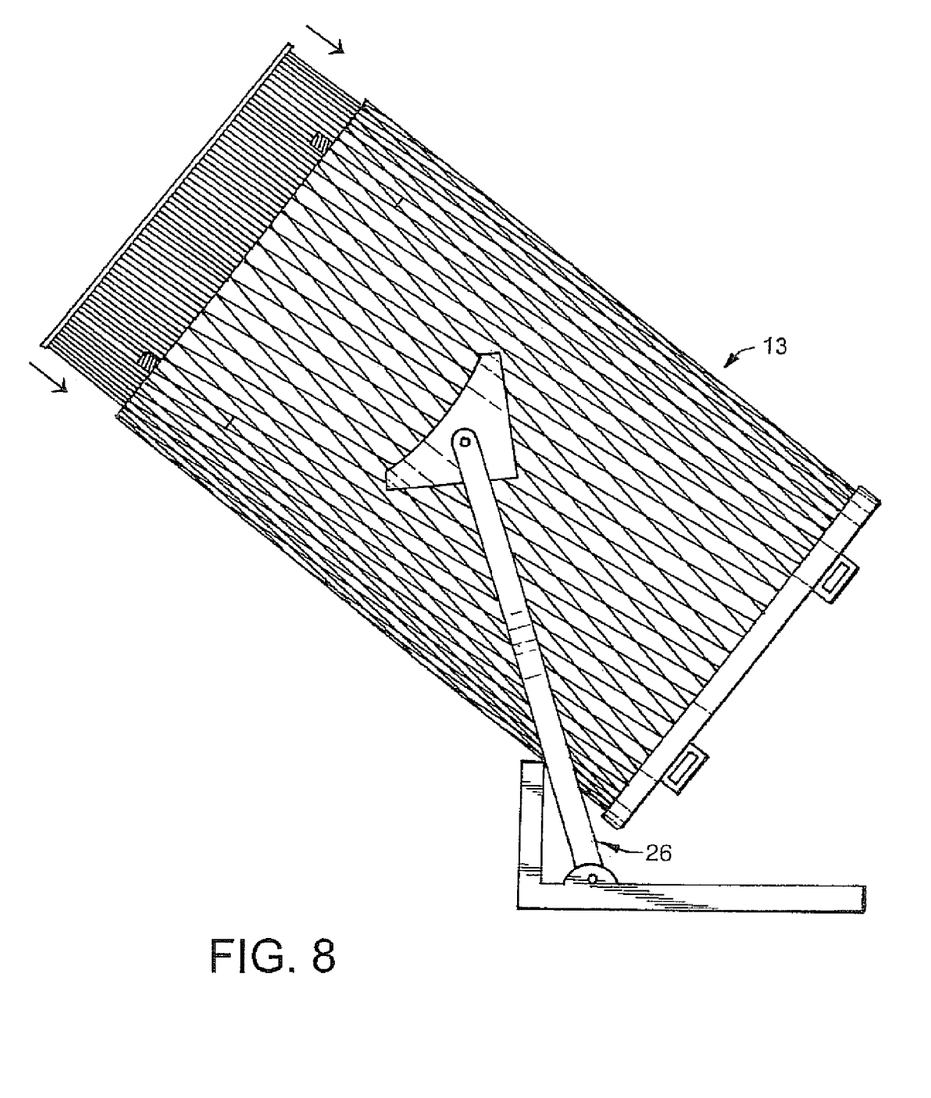
FIG. 8 is a side view of the filter machine in clean filter insertion position.
Figure 9:
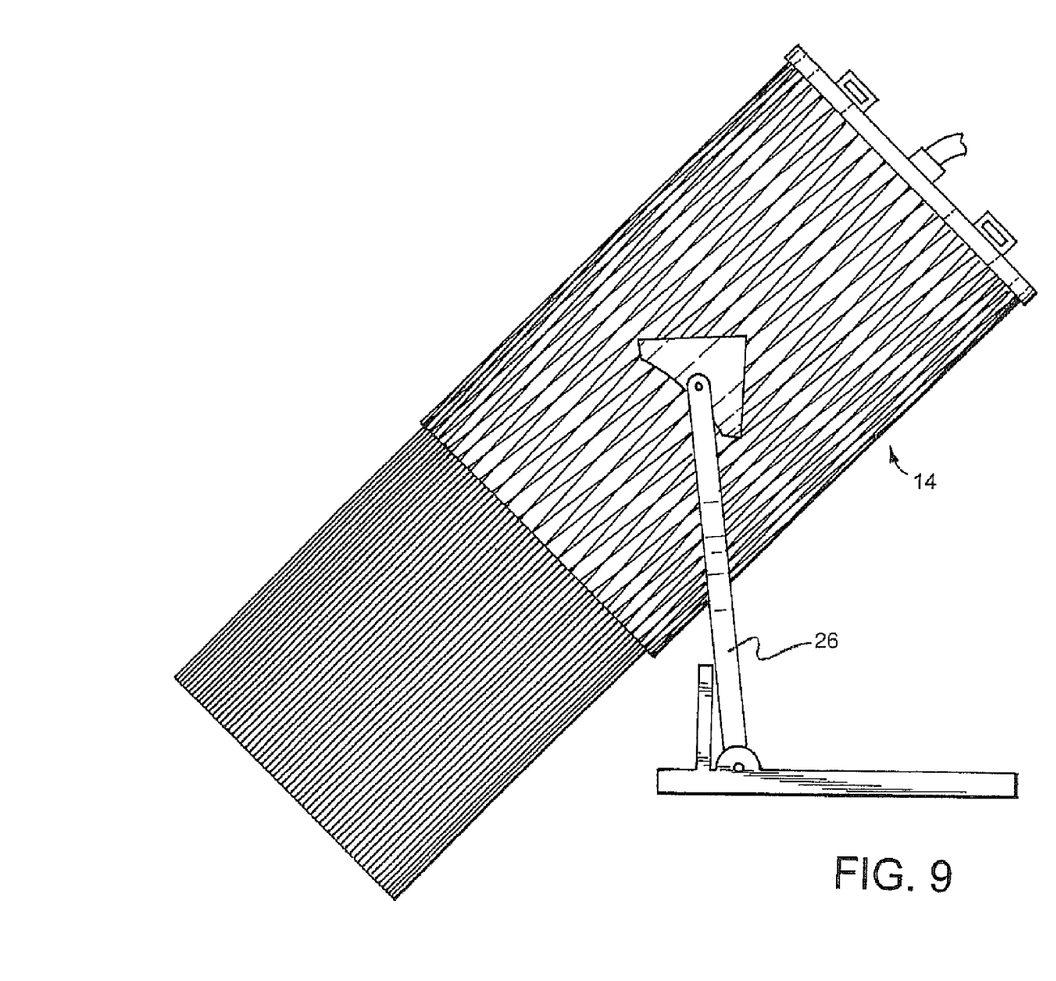
FIG. 9 is a side view of filter apparatus in dump position.
Figure 10:
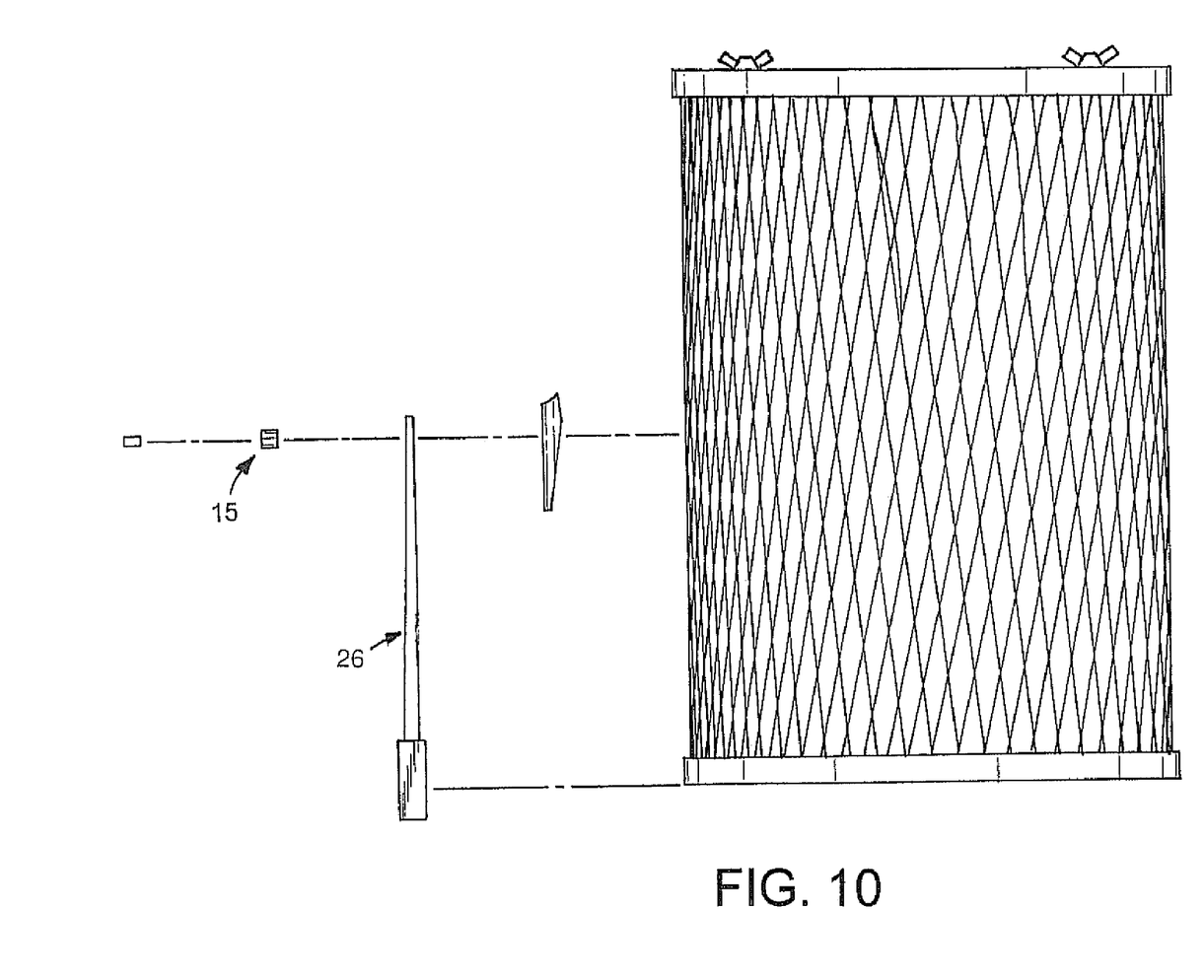
FIG. 10 is an exploded view of pin, bushing, derrick arm, and securing plate.

As best seen in FIGS. 6 and 7, two trunnion shafts 10 located at the extreme right and left of the cylinders are each welded onto a pad 11, and the pads are welded onto the cylinder exterior surface. Swing arms 26 are pivotally coupled to the trunnion shafts 10 by bearings 15 (FIG. 10). The vertical (parallel to the cylinder center lines) location of the trunnion shaft(s) is determined by critical evaluation of the balance and forces required to manually rotate the two cylinders to three pre-determined balanced resting positions, namely, a vertical, in-operation position 12 (i.e., FIGS. 6, 7); a top-ends-out servicing position 13 (FIG. 8); and a downward-facing dump position 14 (FIG. 9). Metal handle(s) 16 welded to the trunnion shafts or to the cylinders, are balanced and placed to facilitate ergonomically optimum displacement of the cylinders to each of the three resting positions, and back again, during the change-out procedure.

Figure 11:
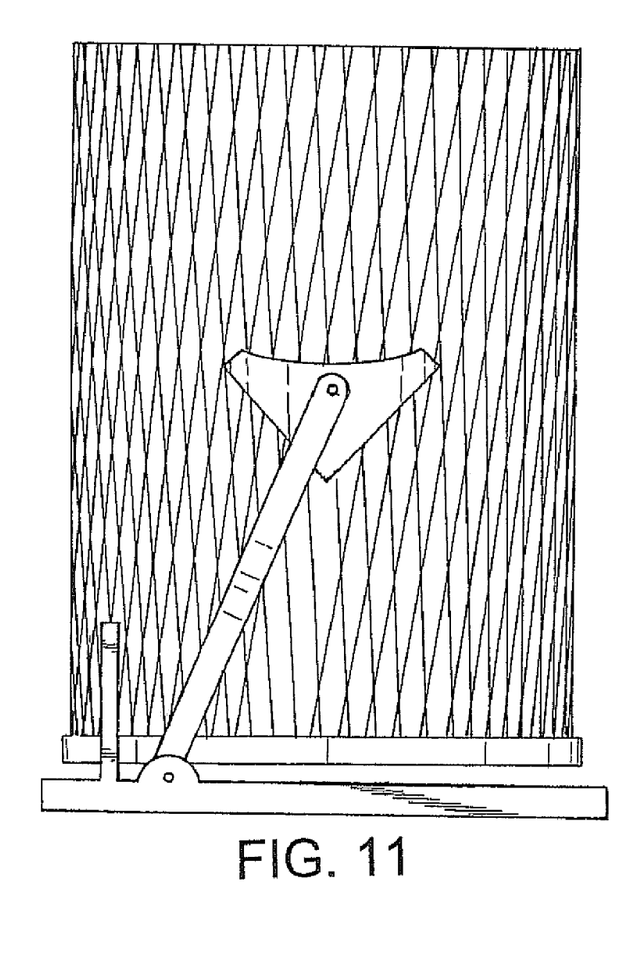
FIG. 11 is a side view of filter apparatus, with end caps off.
Figure 12:
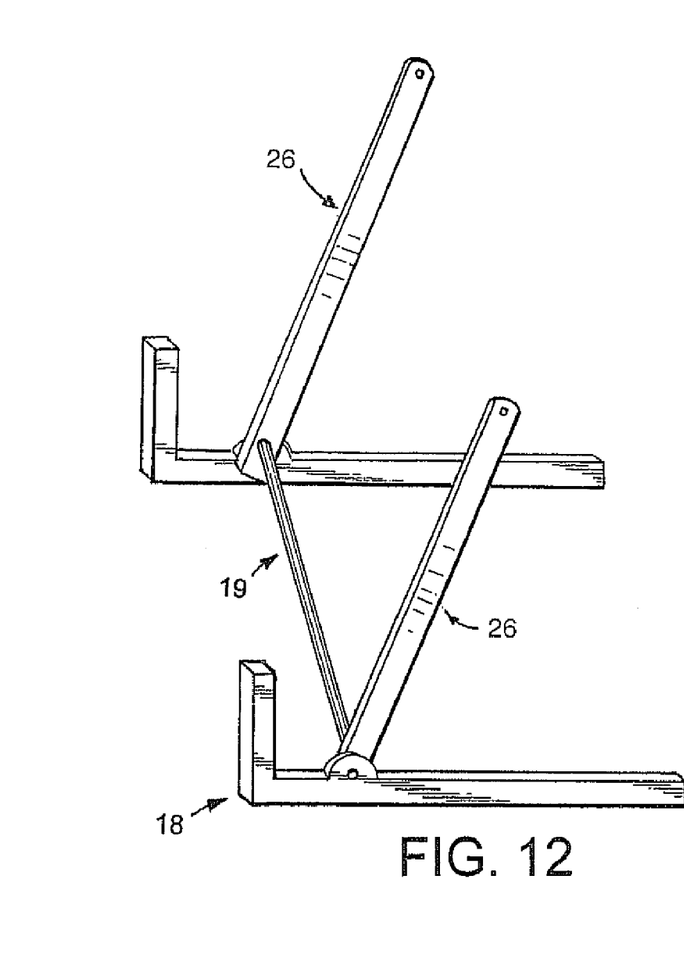
FIG. 12 shows a swing arm assembly, without filter vessels.

Flat metal bars 17 (FIG. 11) attached by screws to the floor of the EDM's filter cabinet are used to seat and stabilize the apparatus inside the filter cabinet. These same metal bars are bent upward 18 (FIG. 12) from the cabinet floor to secure the trunnion shafts and their attached cylinders in the servicing and dump positions. A round metal bar 19 is attached to each of the flat metal bars 17 and runs between them. This is fixtured with bearings to allow rotation of trunnion shafts and their attached cylinders to aforementioned three positions.

Figure 13:
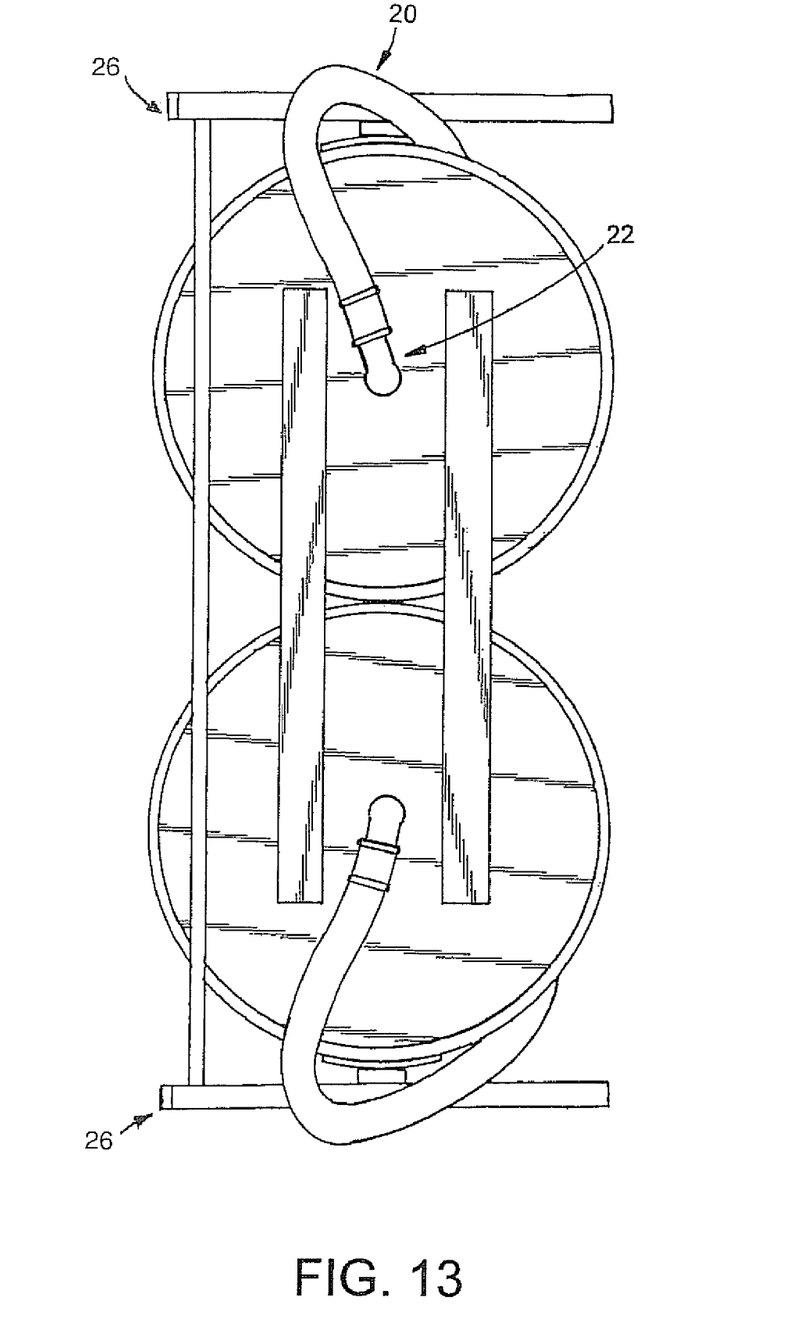
FIG. 13 is a bottom view.
Figure 14:
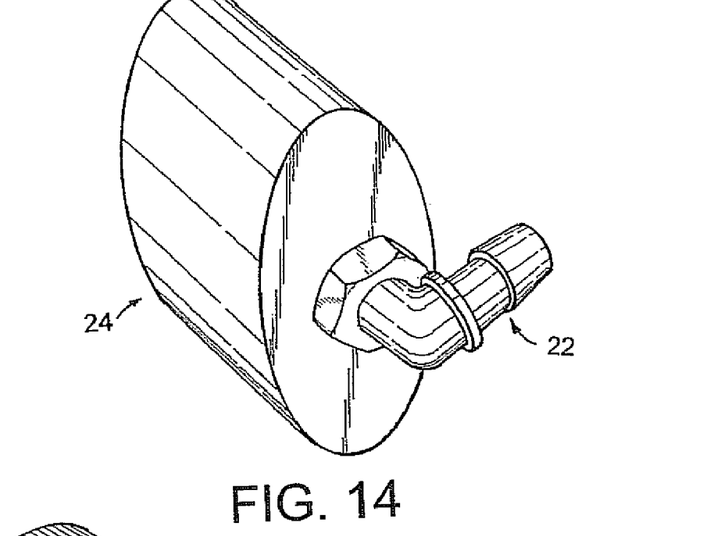
FIG. 14 is a non-round inlet fitting with an attached plumbing elbow.

Referring to FIG. 13, two flexible hydraulic hoses 20 are attached from the EDM to transport the dirty work fluid to the inlet fitting of the filter machine. Springs (not shown) can be wrapped around each hose to enable coiling and uncoiling during change-out without binding or kinking. Two plumbing elbow fixtures 22 are attached to the center of each bottom end cap and are oriented to secure the hydraulic hose in a manner that permits the hose's retraction to its original position after its extension.

All components are re-usable and composed of materials that are non-corrosive in the EDM flush fluid, such as stainless steel or rust-resistant coated metal parts, brass bearings, and synthetic elastomeric hoses.

Figure 15:
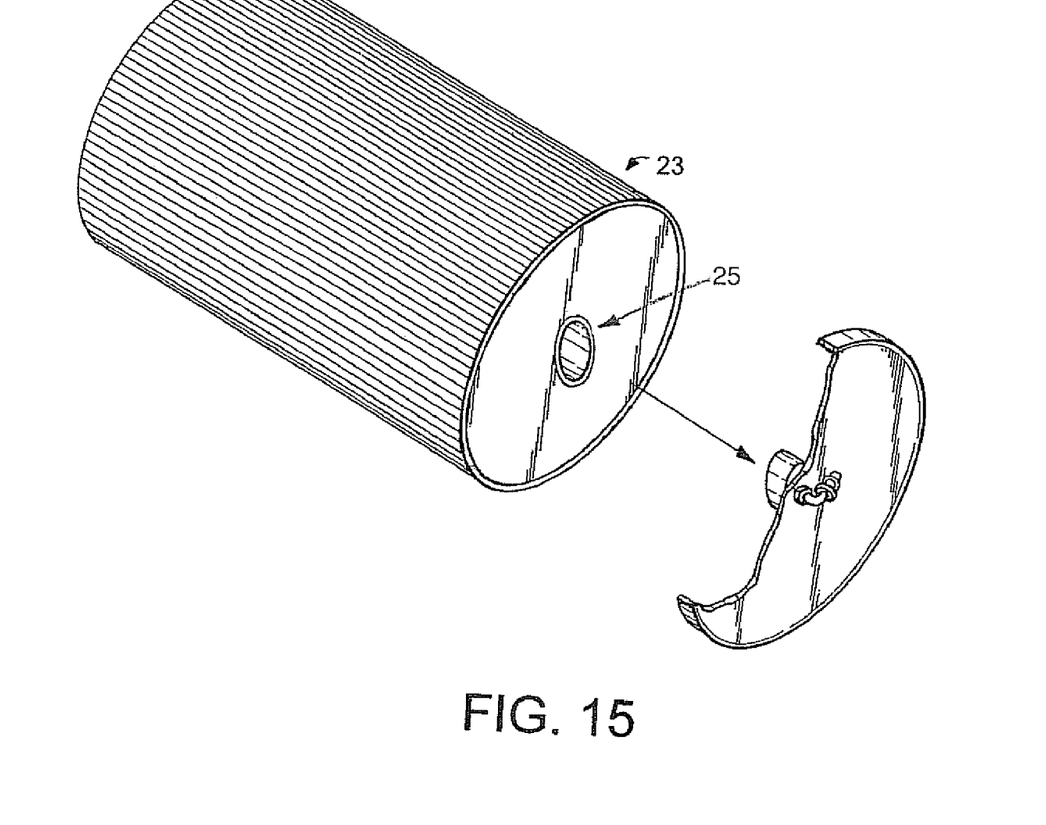
FIG. 15 shows a filter element with a non-round orifice to be inserted into an end cap fitted with a corresponding inlet fitting.

A pair of single-use, pleated, disposable filter elements 23 are fitted into the metal cylinders in order to filter the EDM working fluid and retain the contaminants until change-out. As opposed to a round inlet fittings as shown in FIG. 3, an eccentric or non-circular inlet fitting 24 may be used as shown in FIG. 15. This eccentric or non-circular inlet fitting 24 engages and seals against the plastomeric inner diameter of the filter element's bottom opening 25, and serves simultaneously as a key or identifying device to ensure that the proper filter is being inserted.

The invention improves upon the existing art by providing greater ease of use, a lower unit cost for the filter elements, increased filter life, and environmental benefits. These advantages are achieved with a simple arrangement involving no motorized or electric-powered parts.

At the end of their service life, current wire EDM filters are filled with water and metal sludge and can weigh more than 65 lbs each. During change-out using existing techniques, there is no avoiding lifting and contact with the heavy, dirty filters. Their removal and transfer is a difficult chore. The invention, by employing the metal components in a re-usable rather than disposable fashion, and by providing a more ergonomically efficient method for filter change-out, greatly increases the ease of use for the operator.

Much of the materials costs of current EDM filters are in the disposable metal components: the end caps, wrapper, core, and hose fitting. By utilizing re-usable metal parts, the invention provides an intrinsically lower-cost approach.

Due to the significant weight of a dirty EDM filter and the effort involved to remove it by hand, the overall size of the cylindrical wire EDM filters is seldom larger than 500 mm height×300 mm diameter. There is, however, more unused volume available in the existing filter cabinets. Because of its greater ease of use, larger filters are incorporated into the invention's design, increasing the potential service life of the individual filters. Since the invention foregoes the consumption of metal components, instead employing re-usable metal parts, the environment is better served. Filter disposal costs are also lowered.

The invention provides a filtering apparatus and disposal method of a versatile nature. It is capable of being fitted to filter liquid contaminants of various types. The invention could be plumbed with stop valves so that an individual canister fixtured with its own swing arm assembly could be serviced while other canisters continue to function. Coolant filtration applications vary widely in metal-working industries. There may be as many as several dozen machine tools for which one coolant system is employed, with individual machines having individual reservoirs or sharing a single large reservoir.

A second example of the invention's potential versatility is the invention's proposed filter design that avoids the use of consumable metal parts. There is greater access to the used filter media. This could facilitate reclamation of reusable contaminants such as in-process pharmaceuticals or precious metals findings directly off the filter media.

Thus, although the specific preferred embodiment is a retrofit device for collecting the metal sludge of EDMs, its principles could be readily extended to the filtration of other machining, process, and industrial fluids.

I claim:

1. A system for holding and exchanging a filter of the type receiving fluid through a bottom opening to be filtered from the inside out, the system comprising:
    a base;
    a housing to receive the filter, the housing having a top that opens and a bottom cap with an interior inlet fitting coupled to a supply line carrying fluid to be filtered; and
    a pair of opposing swing arms, each having one end pivotally connected to the base and another end pivotally connected to an opposing side of the housing, the housing and swing arms facilitating:

a first state, wherein the housing and filter are vertically oriented with the bottom opening of the filter sealed against the inlet fitting for filtering operation, and a second state, wherein the housing is pivoted such that the top is oriented downwardly allowing the filter to disengage from the fitting and slide out of the housing.

2. The system of claim 1, including a pair of housings rigidly connected to one another, and wherein each swing arm is coupled to an opposing side of one of the housings.

3. The system of claim 1, including a stop member that engages with the swing arms facilitating an intermediate position wherein the housing is tilted for the loading of a new filter.

4. The system of claim 1, wherein the housing is generally cylindrical.

5. The system of claim 1, including a removable cap to cover the open top during the filtering operation.

6. The system of claim 1, wherein the inlet fitting is round or non-round in cross section.

7. The system of claim 1, wherein the housing is perforated, thereby enabling fluid passing through the filter to flow outwardly and onto the base.

8. The system of claim 1, wherein each swing arm is attached to a point on the housing equidistant from the center thereof.

9. An electrical discharge machine (EDM) fluid-filtration system, comprising:

a generally cylindrical EDM filter receiving fluid from an EDM machine through a bottom opening to be filtered from the inside out;

a base;

a generally cylindrical housing to receive the filter, the housing having a top that opens and a bottom cap with an interior inlet fitting coupled to a supply line carrying fluid to be filtered; and a pair of opposing swing arms, each having one end pivotally connected to the base and another end pivotally connected to an opposing side of the housing, the housing and swing arms facilitating:

a first state, wherein the housing and filter are vertically oriented with the bottom opening of the filter sealed against the inlet fitting for filtering operation, a second state, wherein the housing is pivoted such that the top is oriented downwardly allowing the filter to disengage from the fitting and slide oat of the housing, and an intermediate position wherein the housing is tilted for the loading of a new filter.

10. The system of claim 9, including a pair of housings rigidly connected to one another, each with a filter, and wherein each swing arm is coupled to an opposing side of one of the housings.

11. The system of claim 9, including a stop member that engages with the swing arms facilitating the intermediate position.

12. The system of claim 9, wherein the housing is generally cylindrical.

13. The system of claim 9, including a removable cap to cover the open top during normal filtering operation.

14. The system of claim 9, wherein the inlet fitting is round or non-round in cross-section.

15. The system of claim 9, wherein the housing is perforated, thereby enabling fluid passing through the filter to flow outwardly and onto the base.

16. The system of claim 9, wherein each swing arm is attached to a point on the housing equidistant from the center thereof.

\* \* \* \* \*